United States Patent [19]
Jacobs

[11] Patent Number: 5,379,522
[45] Date of Patent: Jan. 10, 1995

[54] ORIFICE ECCENTRICITY MEASUREMENT TOOL

[75] Inventor: James L. Jacobs, Duson, La.

[73] Assignee: Oilfield Production Equipment Co., Ltd., Lafayette, La.

[21] Appl. No.: 898,031

[22] Filed: Jun. 12, 1992

Related U.S. Application Data

[63] Continuation-in-part of Ser. No. 803,122, Dec. 4, 1991, abandoned.

[51] Int. Cl.$^6$ ............................................. G01B 5/20
[52] U.S. Cl. ...................................... 33/543; 33/542.1
[58] Field of Search ...................... 33/543, 542, 542.1, 33/550, 551, 552, 553, 554, DIG. 8; 73/3, 4 R, 1 J

[56] References Cited

U.S. PATENT DOCUMENTS

| | | |
|---|---|---|
| 331,529 | 12/1885 | Nason . |
| 863,909 | 8/1907 | Evans . |
| 865,498 | 9/1907 | Kenyon . |
| 1,311,128 | 7/1919 | Kilgour . |
| 1,448,528 | 3/1923 | Elliott . |
| 1,747,790 | 2/1930 | Pearson . |
| 1,878,296 | 9/1932 | Schmidt et al. . |
| 1,896,795 | 2/1933 | Kendall . |
| 1,955,048 | 4/1934 | Bley . |
| 2,451,720 | 10/1948 | Davis . |
| 2,480,399 | 8/1949 | Dolaser . |
| 2,546,665 | 3/1951 | Enander . |
| 2,581,473 | 1/1952 | Eisele . |
| 2,766,532 | 10/1956 | Eisele . |
| 2,840,920 | 7/1958 | Clifton . |
| 2,860,421 | 11/1958 | Smith . |
| 2,963,090 | 12/1960 | Cole et al. . |
| 2,978,814 | 4/1961 | Burhans . |
| 3,555,804 | 1/1971 | Murph . |
| 3,624,884 | 12/1971 | Scime . |
| 3,643,983 | 2/1972 | Ludeman . |
| 3,882,608 | 5/1975 | Macklyn . |
| 4,181,018 | 1/1980 | Schmoock . |
| 4,345,464 | 8/1982 | Herzl et al. . |
| 4,367,591 | 1/1983 | Hirabayashi et al. . |
| 4,447,956 | 5/1984 | Chung . |
| 4,701,989 | 10/1987 | Cayzer . |
| 4,773,164 | 9/1988 | Taylor et al. . |
| 4,864,707 | 9/1989 | Kamenster . |
| 5,155,919 | 10/1992 | Thomas . |
| 5,168,638 | 12/1992 | Barton . |

FOREIGN PATENT DOCUMENTS 276212 7/1914 Germany .

OTHER PUBLICATIONS

One Drawing of Applicant James L. Jacobs' Orifice Centering Tool (Prior Art).

Primary Examiner—Mark Rosenbaum
Assistant Examiner—David P. Bryant
Attorney, Agent, or Firm—Pravel, Hewitt, Kimball & Krieger

[57] ABSTRACT

A measurement tool and method for measuring the eccentricity of an orifice plate bore in a longitudinal bore of an orifice fitting is disclosed. The measurement tool includes a housing having a first and second plurality of radial bores. At least one ball is inserted in each of the pluralities of radial bores. A first and a second member are rotated to radially force the pluralities of balls outwardly of the housing against the longitudinal bore of the orifice fitting. A head assembly is attached to the housing. An insertion member having a tapered end portion is inserted in the orifice plate bore. A slide member is connected to the insertion member and is slidably mounted in the head assembly. A rod is slidably inserted through the housing and into the head assembly. An arm is pivotally mounted in the head assembly having a first surface in contact with the slide member and a second surface in contact with an end of the rod. An indicator gauge assembly contacts a second end of the rod.

11 Claims, 6 Drawing Sheets

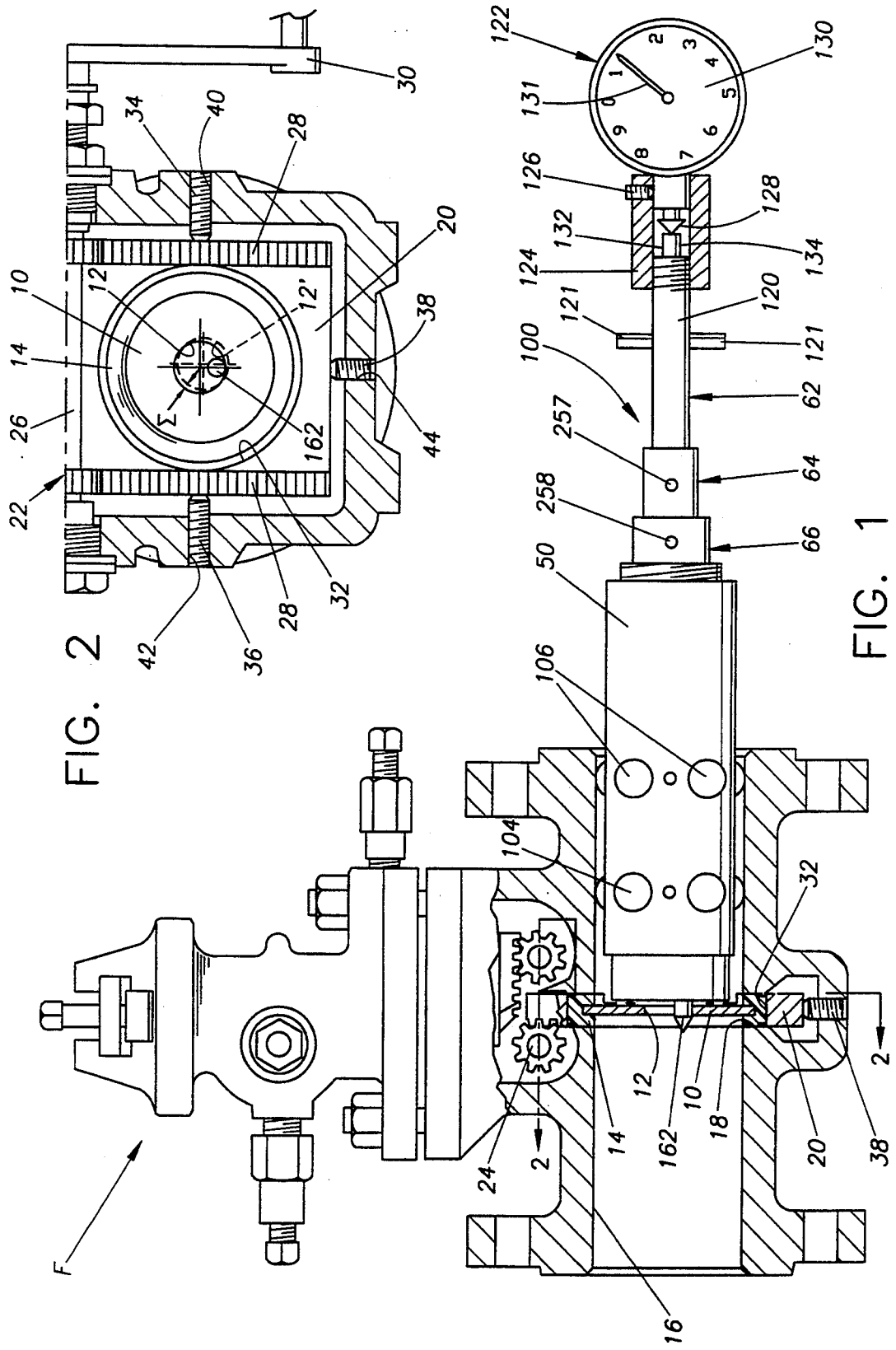

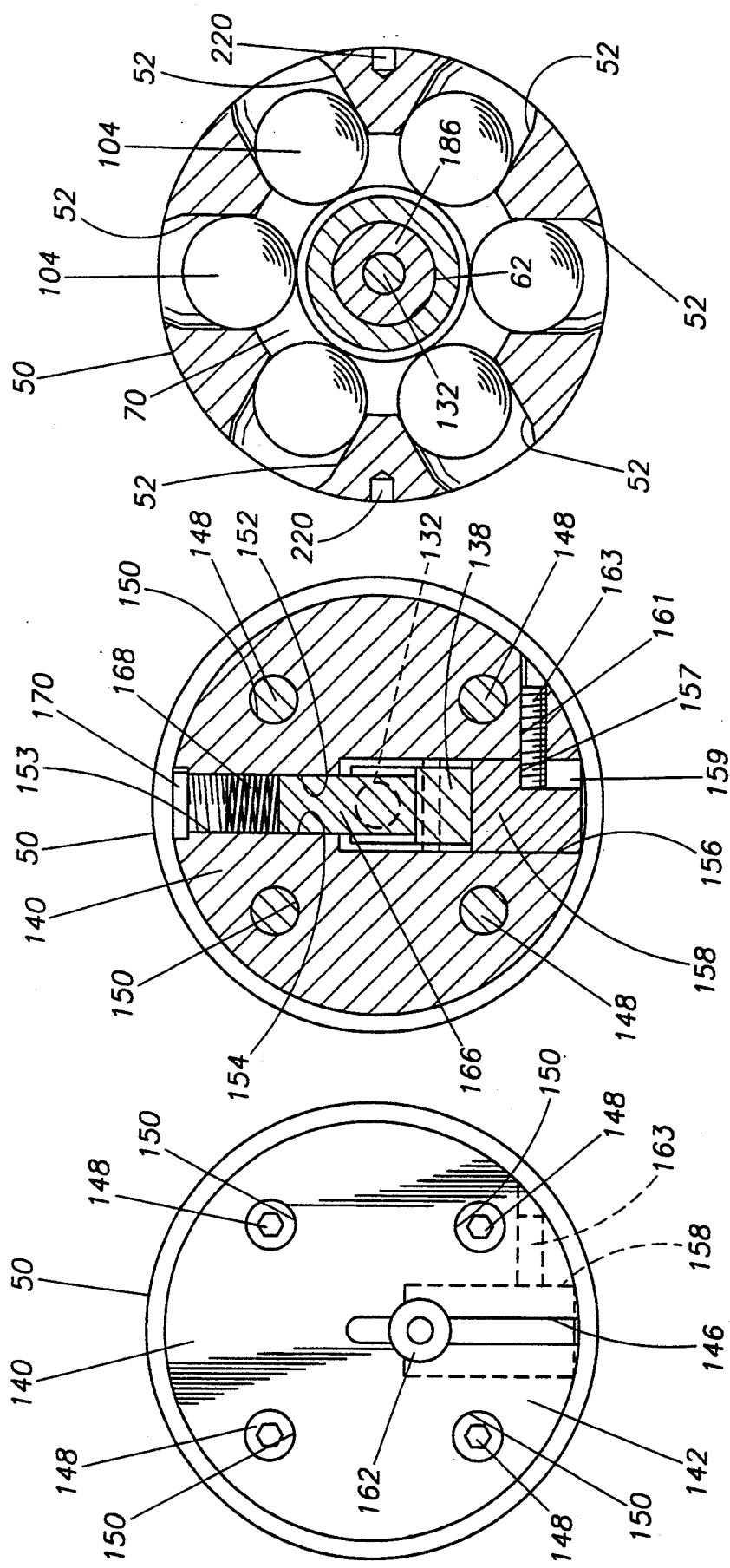

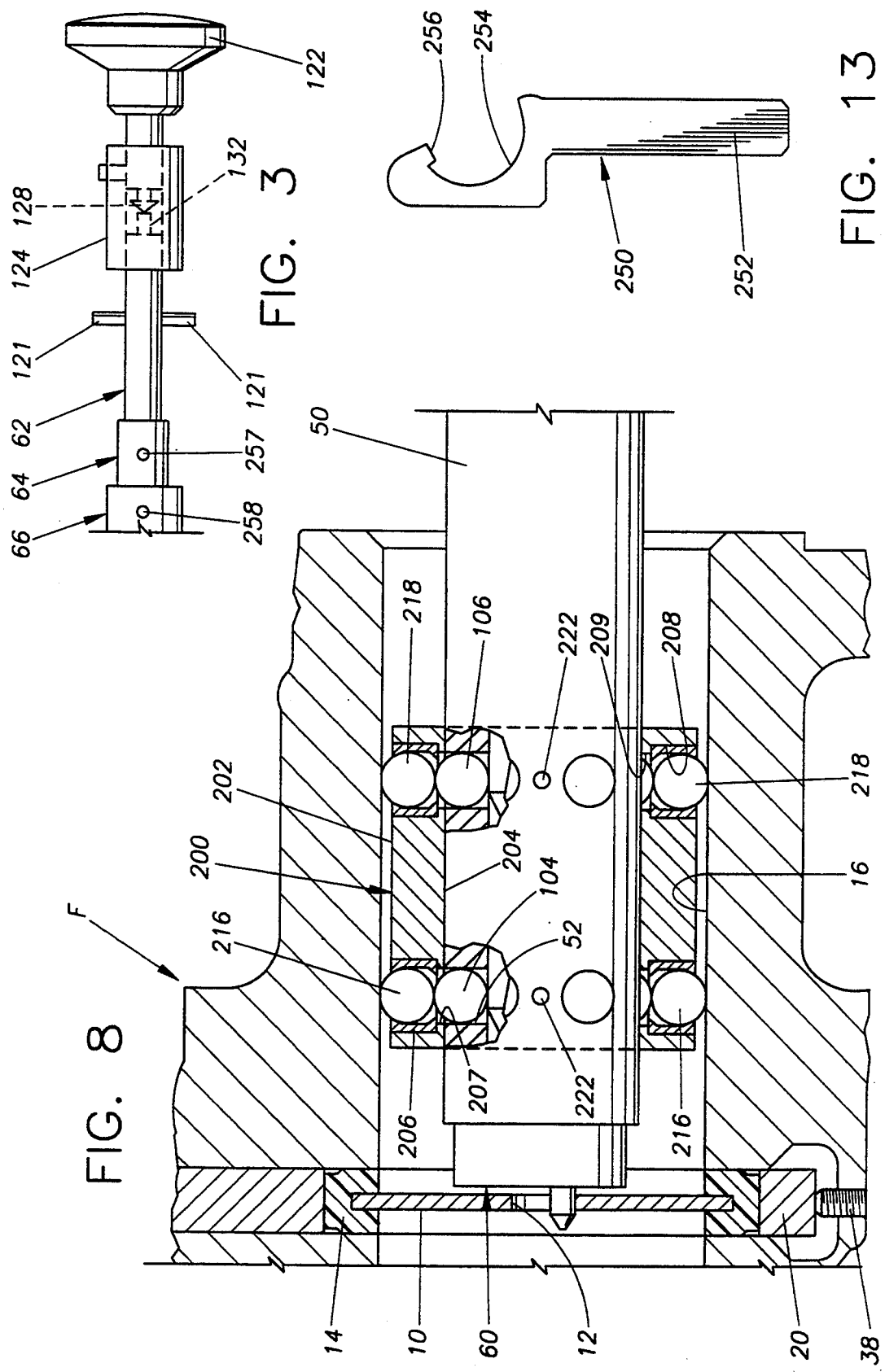

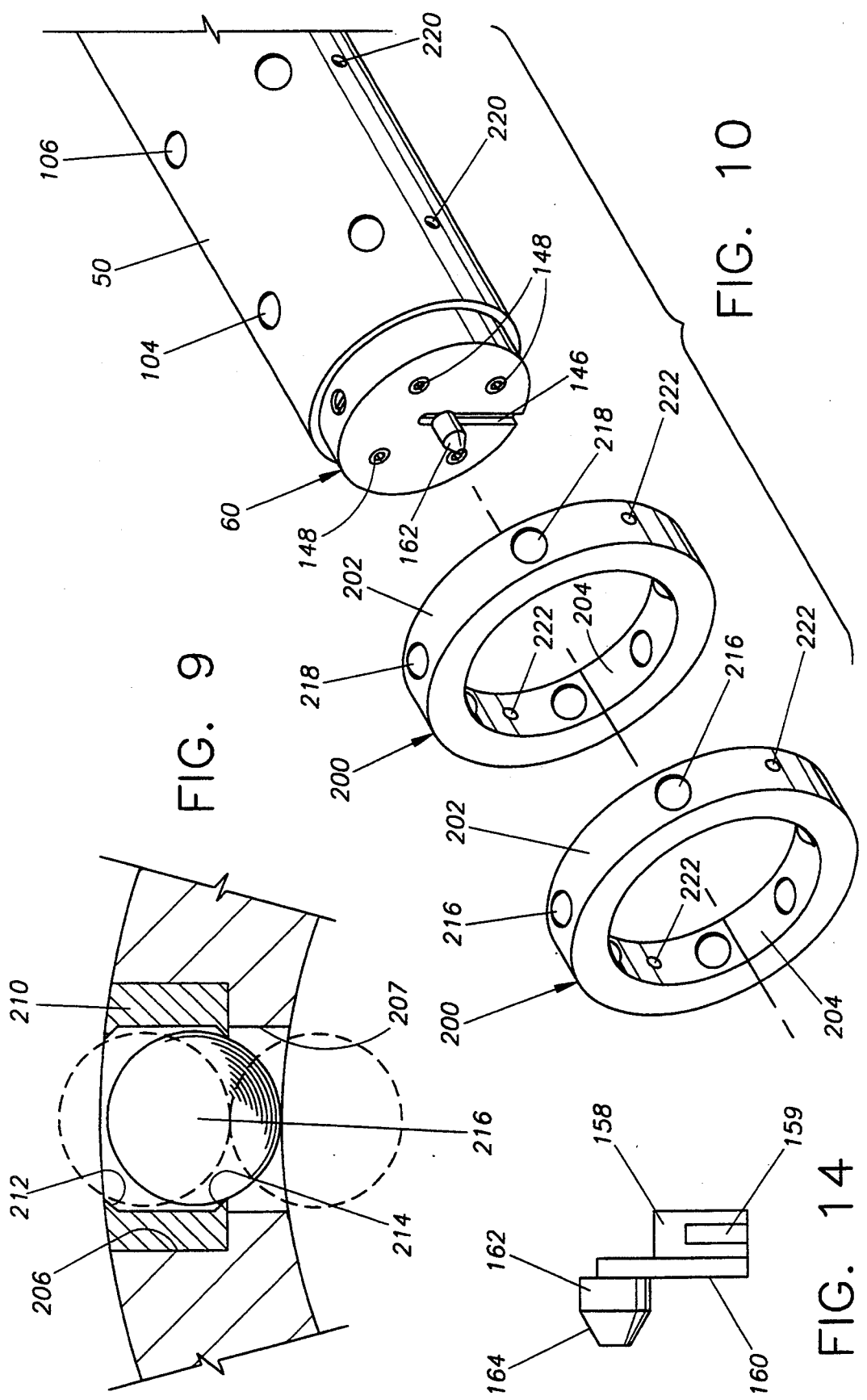

ORIFICE ECCENTRICITY MEASUREMENT TOOL

This application is a continuation-in-part of copending U.S. patent application Ser. No. 07/803,122, filed Dec. 4, 1991, now abandoned entitled Orifice Centering Tool with Eccentricity Gauge and Method of Using Same. The inventor listed in the present application is the named inventor in application Ser. No. 07/803,122.

BACKGROUND OF THE INVENTION

1. Field of the Invention

The present invention relates to orifice fittings for determining the rate or flow of a fluid through a pipe and, more specifically, to a tool for measuring the orifice eccentricity in orifice fittings and a method of using same.

2. Description of the Prior Art

The predominant measurement in the process industry is flow rate. The need for accuracy in the measurement of fluid flow in the process industry is extremely important. A small error in the measurement of large quantities of a fluid through a pipe translates into a loss of income.

Normally, wherever possible, flow rates are measured with a flat plate orifice which is installed in the pipe carrying the fluid. Oftentimes, the flat plate orifice is housed in an orifice flow meter called an orifice fitting as shown in FIG. 1. The flat plate orifice has a circular bore whose diameter is less than the diameter of the pipe in which it is installed. As Venturi discovered in the late 1700's, fluids gain speed and lose pressure when flowing through a converging section of pipe. Thus, as the fluid converges and accelerates to flow through the smaller bore, it loses pressure. The loss of pressure becomes the differential pressure used to measure the rate of flow.

Many factors affect the accuracy of the readings and the determination of the rate of flow. Standards have been established and adopted by various professional associations. The most popular basis for orifice flow meter design and installation and the accepted standard of orifice flow meter design and installation for the natural gas industry and the process industries in the United States and Canada is the American Gas Association (AGA) publication, Orifice Measurement of Natural Gas, Gas Measurement Committee Report No. 3. The American Petroleum Institute (API) incorporates the AGA publication in its Manual of Petroleum Measurement Standards, Chapter 14—Natural Gas Fluids Measurement. Among the many standards established in these publications is the maximum allowable orifice plate bore eccentricity $\Sigma$. The orifice plate bore must be concentric with both the upstream and downstream inside wall of the orifice plate holder, although the eccentricity with respect to the upstream side is the most critical.

FIG. 1 shows a typical orifice fitting, generally designated as F, representative of a class of orifice holders that is widely used throughout the industry. It is also noted that FIG. 1 also shows one embodiment of the present invention generally designated as 100. Referring to FIG. 1, the bore or orifice 12 of the orifice plate 10 must be concentric or within an allowable eccentricity $\Sigma$ with the upstream and downstream inside diameter of the bore of the orifice fitting F. Due to the length of the longitudinal bore of the orifice fitting and the length of the longitudinal bore on either side of the orifice plate 10, it is extremely difficult to obtain an accurate reading of the concentricity or eccentricity of the orifice plate bore in the orifice fitting. The length of the longitudinal bore prevents this measurement from being taken conventionally with, for example, micrometer calipers or some other conventional precise measurement instrument.

It is desirable to have a simple and extremely reliable apparatus and method of checking and ensuring that the orifice plate bore is concentric, or within the allowable eccentricity, with the upstream and downstream bore in the orifice fitting. It is furthermore desirable to have a tool which is adaptable to be used in various orifice fitting bore diameters and with various orifice plate bore diameters. Additionally, it is desirable to have a portable apparatus which gauges the eccentricity of the orifice plate bore. It is furthermore desirable to have an apparatus which maintains a high degree of accuracy even in orifice fittings having longitudinal bore diameters which vary slightly from the published diameter or which vary slightly along the length of the bore. It would also be desirable for this apparatus and method to be readily available for use in the field or at the manufacturing facility.

SUMMARY OF THE PRESENT INVENTION

The present invention provides an orifice eccentricity measurement tool that is simple to use and extremely reliable in measuring the eccentricity of the orifice of an orifice plate in an orifice fitting. The eccentricity measurement tool includes a generally cylindrical housing having a first and second plurality of radial bores. A centering ball is inserted in each of the radial bores and is forced radially outward of the housing by a tapered end of a centering shaft. A first centering shaft contacts the first plurality of radial balls and a second centering shaft contacts the second plurality of radial balls. The first and second centering shafts threadably engage the interior of the housing and have rear portions which extend beyond the rear of the housing. As the first and second centering shafts are rotated towards the front of the housing, the centering balls are forced radially outward against the longitudinal bore of the orifice fitting. The shafts are rotated until the centering balls firmly engage the longitudinal bore.

The eccentricity measurement tool further includes a head assembly at the front end of the measurement tool which is permitted to rotate by rotating an indicator sleeve which extends through and beyond the rear of the housing. The head assembly includes an insertion member which is inserted in the bore of the orifice plate. The insertion member is spring-loaded to maintain contact against the wall of the bore of the orifice plate as the head assembly is rotated. Radial movement of the insertion member as it traverses the wall of the orifice plate bore is transferred to an indicator gauge at the rear of the indicator sleeve via an indicator rod and pivot member.

An adaptor having a plurality of radial bores and centering balls which correspond to the radial bores and centering balls of the housing may be mounted on the exterior of the housing to adapt the eccentricity measurement tool to various orifice fitting bore diameters. The eccentricity measurement tool further includes easy removal and replacement of the insertion member to accommodate various plate bore diameters.

BRIEF DESCRIPTION OF THE DRAWINGS

In order to more fully understand the drawings referred to in the detailed description of the present invention, a brief description of each drawing is presented, in which:

FIG. 1 is a partial sectional view of a typical orifice fitting and a measurement tool of the present invention;

FIG. 2 is a sectional view taken along line 2—2 of FIG. 1;

FIG. 3 is a view of the end of the measurement tool with the indicator gauge alternatively facing longitudinally away from the measurement tool;

FIG. 5 is a view taken along line 5—5 of FIG. 4;

FIG. 6 is a sectional view taken along line 6—6 of FIG. 4;

FIG. 7 is a sectional view taken along line 7—7 of FIG. 4;

FIG. 8 is a partial sectional view of a typical orifice fitting and the measurement tool with adapter sleeve of the present invention;

FIG. 9 is a sectional view of a portion of the adapter sleeve;

FIG. 10 is a perspective view of one end of the measurement tool and a pair of adapter rings;

FIG. 13 is a tightening tool; and

FIG. 14 is an elevation view of the insertion member and sliding block.

DETAILED DESCRIPTION OF THE INVENTION

Figure 4:
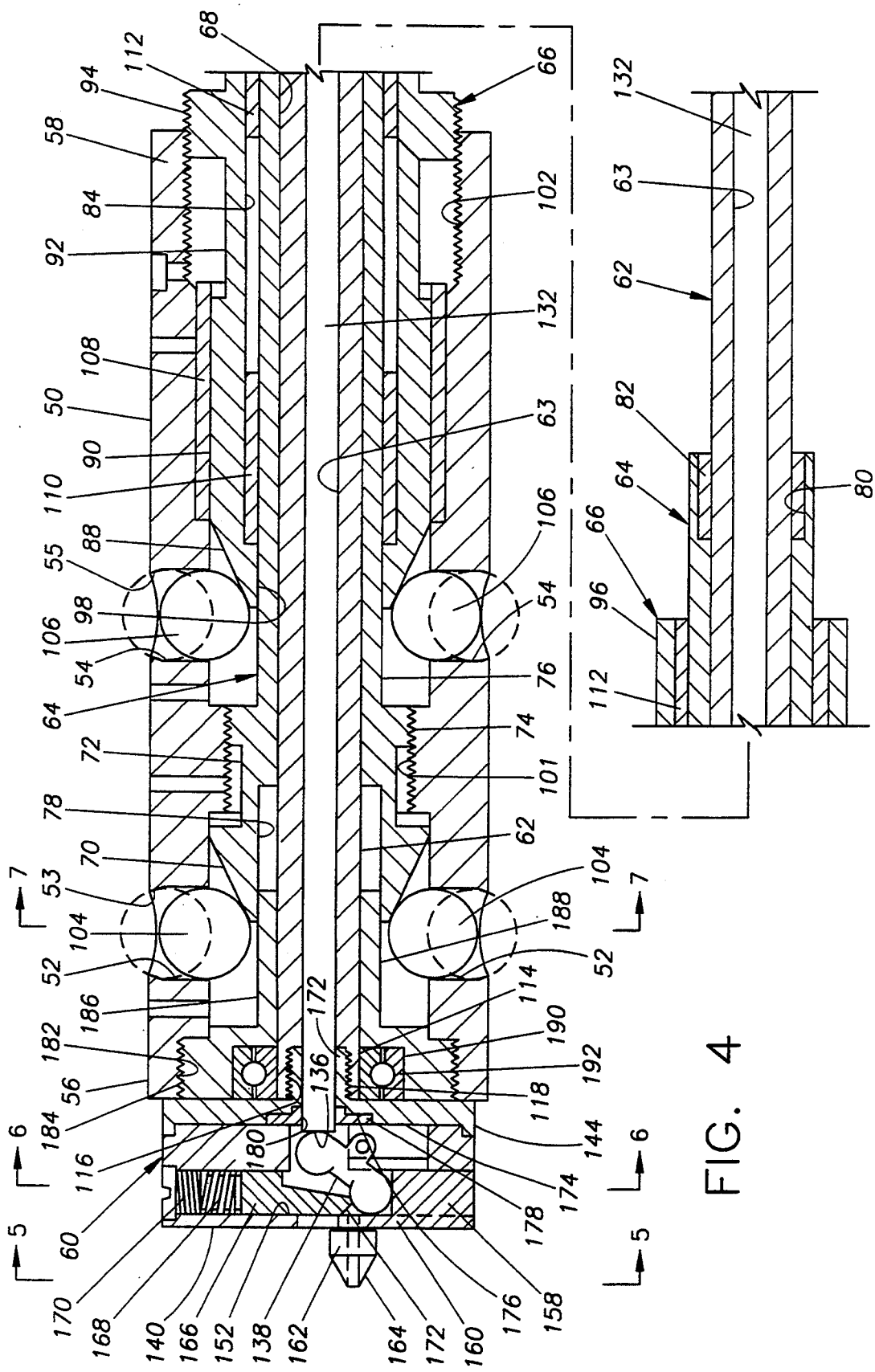
FIG. 4 is a sectional view of the measurement tool of the present invention.

Referring now to FIG. 1, the letter F generally represents a typical orifice fitting having a longitudinal bore 16 extending therethrough. The orifice fitting F includes a plate carrier slot 18 oriented transversely to the longitudinal bore 16 for receiving a carrier plate 20. The carrier plate 20 is raised and lowered into the longitudinal bore 16 with a gear assembly designated generally as 22 as shown in FIG. 2. The gear assembly 22 includes a pair of gears 24 mounted on a shaft 26. The carrier plate 20 includes two rows of teeth 28 which mesh with the gears 24 when inserted in the carrier plate slot 18. A handle 30 connected to an end of the shaft 26 is rotated to raise and lower the carrier plate 20.

As shown in FIGS. 1 and 2, the carrier plate 20 includes a bore 32 having a diameter greater than the diameter of the longitudinal bore 16. An orifice plate 10 has an orifice or bore 12 concentrically located in the orifice plate 10. The orifice plate 10 has a circular outer diameter which is greater than the inside diameter of the longitudinal bore 16. The outer periphery of the orifice plate 10 is received by a seal ring 14. The seal ring 14 and the orifice plate 10 are inserted in the bore 32 of the carrier plate 20. The orifice plate 10 is securely held by the seal ring 14 and the seal ring 14 forms a seal with the outer perimeter of the orifice plate 10 and with the walls of the plate carrier slot 18 to ensure that the fluid flow passes through the bore 12 of the orifice plate 10.

Referring to FIGS. 1 and 2, the typical orifice fitting F includes side adjusting screws 34 and 36 and a vertical adjusting screw 38 which threadably engage threaded holes 40, 42, and 44, respectively, in the orifice fitting F. The adjusting screws 34, 36, and 38 are adjusted to center the bore 12 of the orifice plate 10 in the longitudinal bore 16 of the orifice fitting F.

Referring to FIG. 1, the measurement tool according to the present invention, designated generally as 100, is shown. The measurement tool 100 has a substantially cylindrical housing 50 as best shown in FIG. 10. The housing 50 includes a first plurality of radial bores 52 and a second plurality of radial bores 54 as shown in FIGS. 4 and 7. The housing 50 has an outer diameter which is less than the diameter of the longitudinal bore 16 of the orifice fitting F. The housing 50 has a front end 56 and a rear end 58. Extending beyond the front end 56 of the housing 50 is a head assembly, designated generally as 60. Referring to FIGS. 1 and 4, extending from the rear end 58 of the housing 50 is an indicator sleeve 62, a first centering shaft 64, and a second centering shaft 66.

Referring to FIG. 4, the first centering shaft 64 has a longitudinal bore 68 extending therethrough. The first centering shaft 64 has an externally tapered front end 70 having a recessed portion 72 behind the tapered front end 70. The recessed portion 72 terminates with a threaded portion 74 of the first centering shaft 64. Behind the threaded portion 74 the first centering shaft 64 has a reduced uniform outer surface 76 of constant diameter. The longitudinal bore 68 includes an enlarged bore section 78 at the tapered front end 70. The enlarged bore section 78 extends from the front end of the first centering shaft to a location below the recessed portion 72. At the opposite end of the first centering shaft 64 is a slightly enlarged bore 80 for receiving a bushing 82.

Still referring to FIG. 4, the second centering shaft 66 has a longitudinal bore 84 extending therethrough. The second centering shaft 66 has an externally tapered front end 88 which joins a medial portion 90 of constant diameter. The medial portion 90 terminates with a recessed portion 92. The recessed portion 92 terminates with an enlarged diameter threaded portion 94. Behind the threaded portion 94 of the second centering shaft 66 is a reduced uniform outer surface 96 of constant diameter. The longitudinal bore 84 is uniform throughout the second centering shaft 66 with the exception of a short section having a reduced bore 98 at the tapered front end 88 of the second centering shaft 66.

Referring to FIG. 4, the housing 50 according to the preferred embodiment includes a first set of internal drive threads 101 which engages the threaded portion 74 of the first centering shaft 64. The housing 50 further includes a second set of internal drive threads 102 which engages the threaded portion 94 of the second centering shaft 66.

A first centering ball 104 is inserted in each of the first plurality of radial bores 52. Each of the first centering balls 104 has the same diameter and is slightly smaller in diameter than the first radial bores 52 so that the first centering balls 104 are allowed to radially travel within the first radial bores 52. Preferably, each of the first radial bores 52 include a stop 53 near the outer surface of the housing 50 so that the first centering balls 104 are precluded from dislocating radially outward of the housing 50. Although not shown in FIG. 4, it may also be desirable to have stops at the inner edge of the radial bores 52 to prevent the inward dislocation of the first centering balls 104 from the first radial bores 52.

Similarly, a second centering ball 106 is inserted in each of the second plurality of radial bores 54. The second centering balls 106 have the same diameter and are slightly smaller in diameter than the second radial bores 54 so that the second centering balls 106 are allowed to radially travel within the second radial bores 54. Preferably, each of the second radial bores 54 include a stop 55 near the outer surface of the housing 50 so that the second centering balls 106 are precluded from dislocating radially outward of the housing 50. As discussed above, it may be desirable to include stops at the inner edge of the second radial bores 54.

The stops 53 and 55 are shown in FIG. 4 as having a slightly reduced diameter in the outer extremity of the radial bores 52 and 54. The stops 53 and 55 may be formed by reaming the inner portions of the radial bores 52 and 54 to the desired diameter while leaving a slightly reduced diameter at the outer extremity. The stops 53 and 55 may include other means which restrict the balls 104 and 106 from exiting the radial bores 52 and 54. In the preferred embodiment, the first and second radial bores, 52 and 54 respectively, are the same diameter and the first and second centering balls 104 and 106 are the same diameter.

Referring to FIG. 4, as the first centering shaft 64 is threaded towards the front end 56 of the housing 50, the tapered front end 70 forces the plurality of first centering balls 104 in a radially outward direction (as shown by the dashed lines) which radially centers this portion of the housing 50 in the longitudinal bore 16 of the orifice fitting F. Similarly, the second centering shaft 66 operates to radially center the housing 50 in the longitudinal bore 16.

Referring to FIG. 4, a bushing 108 is placed in the housing 50 to provide a smooth inner surface against which the medial portion 90 of the second centering shaft 66 travels when advancing in and out of the housing 50. A second bushing 110 and a third bushing 112 are positioned in the longitudinal bore 84 of the second centering shaft 66. The second bushing 110 is located at the forward end of the longitudinal bore 84 and adjacent the reduced bore 98. The third bushing 112 is located at the rear end of the longitudinal bore 84 of the second centering shaft 66. The second and third bushings 110 and 112 respectively provide a smooth inner surface against which the first centering shaft 64 may travel. In the preferred embodiment as shown in FIG. 4, the first centering shaft 64 extends entirely through the second centering shaft 66.

Still referring to FIG. 4, the indicator sleeve 62 extends through the longitudinal bore 68 of the first centering shaft 64. The forward end 114 of the indicator sleeve 62 has an internally threaded portion 116 for engaging a threaded portion 118 of the head assembly 60. Referring to FIGS. 1 and 3, the rear end 120 of the indicator sleeve 62 is connected to an indicator gauge 122 via a coupler 124. The coupler 124 is shown as being threadably connected to the indicator sleeve 62 and connected to the indicator gauge 122 with a setscrew 126. It is to be understood that various connecting means may be used to connect the indicator sleeve 62 to the indicator gauge 122.

FIG. 3 shows the indicator gauge 122 rotated 90° from the indicator gauge 122 as shown in FIG. 1. Preferably, the indicator gauge 122 is oriented as shown in FIG. 3 for reasons which will be explained in the operation of the measurement tool below. The indicator gauge 122 is a typical gauge as available from Fowler Company, Model No. 52-520-140. The indicator gauge 122 has a spring-loaded deflector 128 which permits deflection to be indicated on the face 130 of the gauge 122. Additionally, the face 130 may be rotated so as to "zero" the gauge 122 by aligning the "0" with the needle 131.

Referring to FIGS. 1 and 3, the indicator sleeve 62 includes a pair of handles 121 near the coupler 124 which facilitates the rotating of the indicator sleeve 62 when using the measurement tool 100.

As shown in FIGS. 1 and 3, an indicator rod 132 has a rear end 134 contacting the deflector 128 of the indicator gauge 122. The indicator rod 132 extends through a longitudinal bore 63 of the indicator sleeve 62. Referring to FIG. 4, the indicator rod 132 has a front end 136 which is in contact with a pivot arm 138 in the head assembly 60.

Referring to FIGS. 4, 5, and 6, the head assembly 60 includes an end plate 140 and a base plate 144. The end plate 140 includes a radial slot 146 in an end face 142 which extends from the perimeter of the end plate 140 to and slightly beyond the center of the end plate 140. The end plate 140 is attached to the base plate 144 with a plurality of setscrews 148 recessed in holes 150 in the end plate 140. Referring to FIGS. 4 and 6, the end plate 140 includes a diametric bore 152. In the preferred embodiment, the diametric bore 152 has a first portion 154 having a circular cross-section and a second portion 156 having a square cross-section as shown in FIG. 6. In the second portion 156, a sliding block 158 is housed. Referring to FIGS. 4 and 6, the sliding block 158 has a generally square cross-section slightly smaller than the square cross-section of the second portion 156 of the diametric bore 152. The sliding block 158 has a longitudinal flange 160 (see FIGS. 4 and 14) which extends into the radial slot 146. An insertion pin 162 is connected to the flange 160. As shown in FIG. 4, the insertion pin 162 is located in front of the end face 142 of the end plate 140. The insertion pin 162 is preferably cylindrical in cross-section and has a tapered leading end 164 as shown in FIGS. 4 and 14.

The sliding block 158 further includes a groove 159 as shown in FIGS. 6 and 14. The end plate 140 includes a threaded bore 161 for receiving a block setscrew 163 as shown in FIG. 6. The block setscrew 163 is threaded through the bore 161 and extends into the groove 159 of the sliding block 158. An end 157 of the groove 159 abuts the block setscrew 163 and maintains the sliding block 158 in the head assembly 60.

Referring to FIG. 4, a retractor member 166, a spring 168 and a screw 170 are installed in the first portion 154 of the diametric bore 152. The retractor member 166 has a lower leg 172 in contact with the pivot arm 138. The spring 168 is positioned between the retractor member 166 and the screws 170 in the diametric bore 152. The screw 170 is threaded into a threaded end 153 of the diametric bore 152. The spring 168 maintains pressure against the retractor member 166 such that the pivot arm 138 is biased in the position as shown in FIG. 4.

Referring to FIG. 4, the base plate 144 includes the threaded portion 118 for engaging the indicator sleeve 62. The base plate 144 has a central bore 172 through which the indicator rod 132 extends. The forward face 174 of the base plate 144 has a recessed portion 176 for receiving a bushing 178. The bushing 178 includes a central bore 180 through which the indicator rod 132 extends.

At the front end 56 of the housing 50 is an internally threaded portion 182. The internally threaded portion 182 engages a threaded portion 184 of a centralizer 186.

The centralizer 186 has a tubular portion 188 which fits within the enlarged bore section 78 of the first centering shaft 64. The centralizer 186 includes a bearing recess 190 which receives a bearing 192. The bearing 192 allows the indicator sleeve 62 to rotate smoothly and accurately within the housing 50.

Referring to FIGS. 8 and 10, the measurement tool 100 includes an adapter, designated generally as 200. The adapter 200 is preferably a sleeve-type member as shown in FIG. 8. However, alternatively, the adapter 200 may be comprised of individual rings as shown in FIG. 10. The adapter 200 has a smooth cylindrical outer surface 202 and a smooth cylindrical inner bore 204. Referring to FIG. 8, the adapter 200 includes a first plurality of radial bores 206 and a second plurality of radial bores 208. The first and second plurality of radial bores 206 and 208 are correspondingly spaced to align with the first and second plurality of radial bores 52 and 54, respectively, in the housing 50. The radial bores 206 and 208 have a reduced diameter 207 and 209, respectively, at the inner bore 204. As shown in FIGS. 8 and 9, a race 210 is inserted in the radial bores 206, 208. The race 210 includes upper and lower lips 212 and 214, respectively, which retain the adapter centering balls in the race 210.

A first adapter centering ball 216 is inserted in each of the first plurality of radial bores 206. Each of the first adapter centering balls 216 has the same diameter and is slightly smaller in diameter than the inner diameter of the race 210 so that the first adapter centering balls 216 are allowed to radially travel between the upper and lower lips 212 and 214 of the race 210.

Similarly, a second adapter centering ball 218 is inserted in each of the second plurality of radial bores 208. The second adapter centering balls 218 have the same diameter and are slightly smaller than the inner diameter of the race 210 so that the second adapter centering balls 218 are allowed to radially travel between the upper and lower lips 212 and 214 of the race 210.

Referring to FIG. 8 and FIG. 10, the housing 50 includes at least one alignment bore 220 for aligning the centering balls 216 and 218 of the adapter 200 with the centering balls 104 and 106 of the housing. The adapter includes at least one bore 222 which when aligned with the alignment bore 220 of the housing 50 insures that the centering balls are all radially aligned with one another. An alignment screw (not shown) threadably engages the bore 222 and seats below the outer surface 202 of the adapter when the adapter 200 has been aligned and locked into position.

Referring to FIG. 10, the two adapter rings 200 are formed in the same manner as described above for the adapter sleeve 200. Each of the adapter rings 200 includes at least one alignment bore 222 for aligning the centering balls of the ring 200 with the centering balls of the housing 50.

Figure 12:
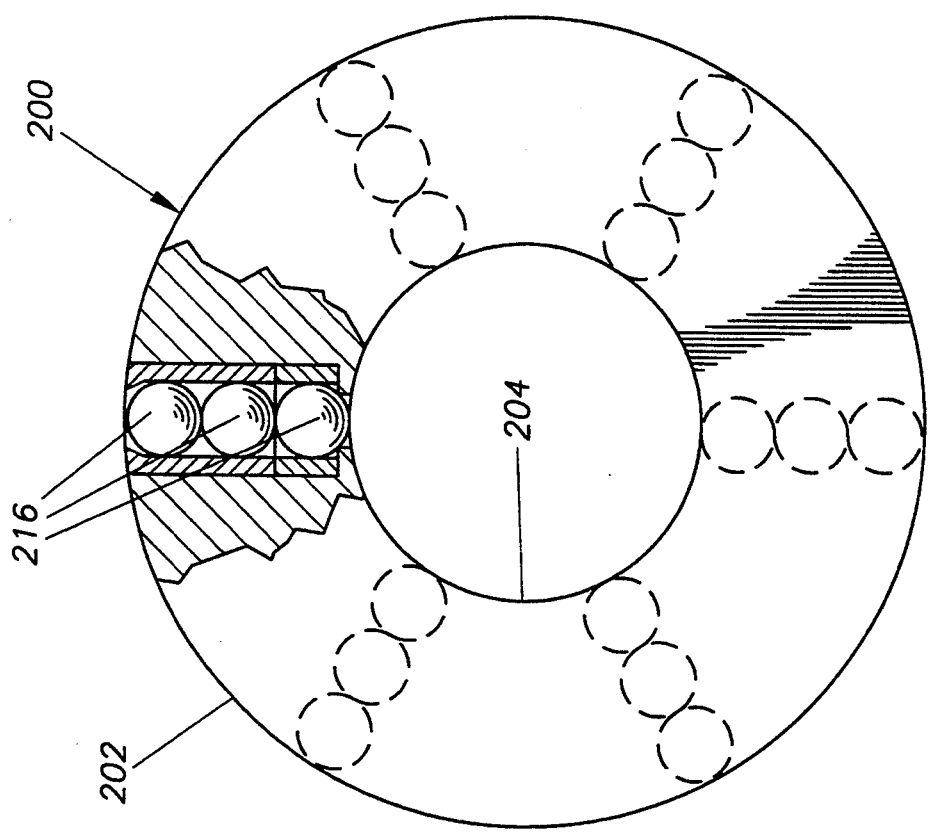
FIGS. 11 and 12 are end views of additional adapter sleeves or rings.
Figure 11:
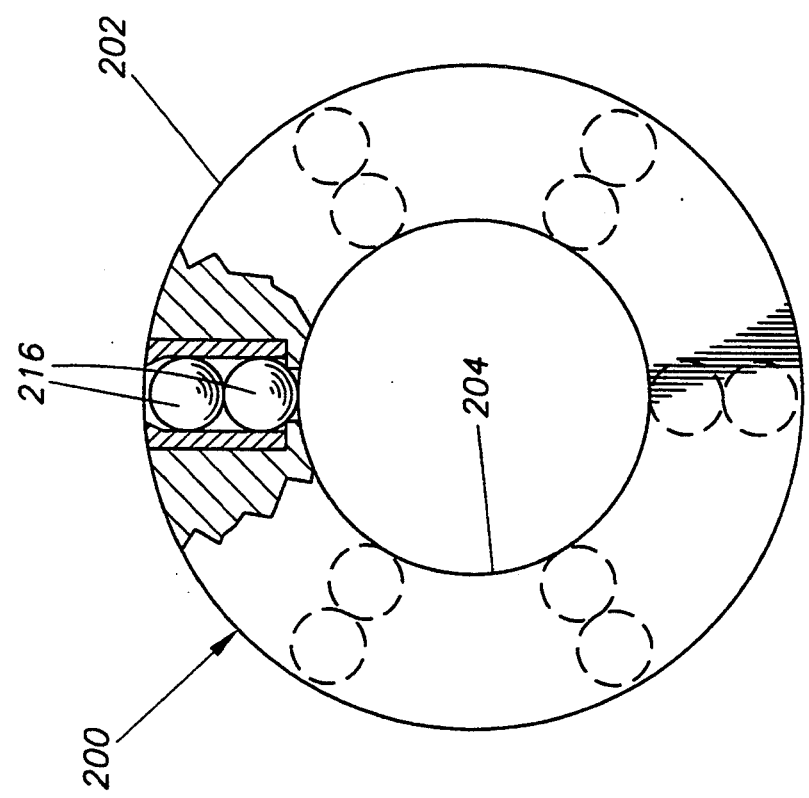

FIGS. 11 and 12 show additional adapters 200 having outside diameters to accommodate various sizes of orifice fittings F. In FIG. 11, the adapter 200 has a stack of two adapter centering balls 216 in each of the radial bores. In FIG. 12, the adapter 200 has a stack of three adapter centering balls in each of the radial bores. The inner bore 204 of the adapters 200 as shown in FIGS. 11 and 12 have the same diameter as the adapter sleeve 200 as shown in FIG. 8. The adapters 200 as shown in FIGS. 11 and 12 may be either the sleeve type or the ring type adapter and are constructed in the same manner as described above.

Operation of the eccentricity Measurement Tool

Prior to inserting the measurement tool 100 into the longitudinal bore 16 of the orifice fitting F, the first and second centering shafts 64 and 66, respectively, have been unscrewed to a retracted position in which the centering balls 104 and 106 are permitted to be entirely within the housing 50 as shown in FIG. 4. In FIG. 1, the measurement tool 100 is being used without the adapter 200. The front end of the measurement tool 100 is inserted in the longitudinal bore 16 of the orifice fitting F. The measurement tool 100 is inserted until the insertion pin 162 contacts the bore wall 12 of the orifice plate 10. The tapered leading end 164 of the insertion pin 162 will first contact the bore wall 12. As the insertion pin 162 is further inserted into the bore 12 of the orifice plate 10, the insertion pin 162 will be forced towards the radial center point of the measurement tool 100. The insertion pin 162 is free to move radially inward by forcing the sliding block 158 further into the diametric bore 152 of the head assembly 60.

After the insertion pin 162 has been fully inserted into the bore 12 of the orifice plate 10, the first centering shaft 64 is rotated to advance the first centering shaft 64 further into the housing 50. As the first centering shaft 64 advances into the housing 50, the tapered front end 70 forces the plurality of first centering balls 104 radially outward. The first centering shaft 64 is rotated until the first centering balls 104 firmly engage the inner wall of the longitudinal bore 16 of the orifice fitting F.

A tightening tool, designated generally as 250, is shown in FIG. 13. The tightening tool has a handle 252 and a circular segment 254 having a radius approximating the radius of the first centering shaft 64. The tightening tool 250 includes a nub 256 at one end of the circular segment 254. The first centering shaft 64 includes a recess 257 (see FIGS. 1 and 8) for receiving the nub 256. The circular segment 254 of the tightening tool 250 is positioned on the first centering shaft 64 and the nub 256 is inserted in the nub recess 257. The handle 252 is then rotated about the first centering shaft 64 to firmly engage the first centering balls 104 against the longitudinal bore 16.

The second centering shaft 66 is then rotated to advance the second centering shaft 66 further into the housing 50 such that the second centering balls 106 are forced radially outward of the housing 50. The second centering shaft 66 is rotated until the second centering balls 106 firmly engage the inner wall of the longitudinal bore 16 of the orifice fitting F. The second centering shaft 66 includes a recess 258 for receiving a nub of a second tightening tool (not shown) which has a circular segment having a radius approximating the radius of the second centering shaft 66. The second tightening tool is the same as the tightening tool 250 shown in FIG. 13 in all other aspects. The measurement tool 100 is now radially centered in the longitudinal bore 16 of the orifice fitting F. As shown in FIG. 1, the insertion pin 162 is fully inserted in the bore 12 of the orifice plate 10 and the plurality of first and second centering balls 104 and 106, respectively, are firmly engaging the inner wall of the longitudinal bore 16 of the orifice fitting F.

The indicator sleeve 62 is now rotated by the pair of handles, preferably in a counterclockwise direction, until the needle 131 of the indicator gauge 122 reaches its farthermost counterclockwise position. As can be seen in FIG. 4, the indicator sleeve 62 is threadably connected to the head assembly 60 such that as the indicator sleeve 62 is rotated, the head assembly 60 is also rotated. Furthermore, as the assembly head 60 is rotated, the insertion pin 162 traverses the inner wall of the bore 12 of the orifice plate 10. The spring 168 and the retractor member 166 indirectly maintain pressure against the sliding block 158 such that the insertion pin 162 always remains in contact with the wall of the orifice plate bore 12. As the insertion pin 162 traverses the bore wall of the orifice plate 10, any eccentricity of the bore 12 will cause the insertion pin 162 to move the corresponding radial distance. Radial movement of the insertion pin 162 results in a movement of the pivot arm 138 which further results in movement of the indicator rod 132, the spring-loaded deflector 128 and the needle 131 of the indicator gauge 122.

Thus, as above stated, the indicator sleeve 62 is rotated counterclockwise until the needle 131 reverses direction from a counterclockwise to a clockwise direction. At the point where the needle 131 reverses direction, the face 130 of the gauge 122 is rotated to align the "zero" reading with the needle 131. The indicator sleeve 62 is now rotated 360° at which time the needle 131 should again be at the zero reading. The maximum reading of the needle 131 occurs at approximately 180° from the "zero" position. The maximum reading is equivalent to two times the eccentricity Σ of the orifice plate bore 12. Thus, the maximum reading divided by two yields the eccentricity of the bore 12 of the orifice plate 10.

To allow for imperfections in the longitudinal bore 16 of the orifice fitting F, such as pitted surfaces or slightly out-of-round longitudinal bores 16, the measurement tool 100 should be rotated by retracting the first and second centering shafts 64 and 66 and rotating the housing 50 to a position in which the centering balls contact the longitudinal bore at different points. The first and second centering shafts are then advanced until the centering balls engage the longitudinal bore 16 of the orifice fitting 12. The same steps as above-described are followed with respect to "zeroing" the indicator gauge 122 and reading the maximum deflection. This same procedure may be repeated by rotating the housing 50 again.

Since orifice fittings F come in many different bore diameters, a series of adapters 200 as shown in FIGS. 8, 10, 11, and 12 can be installed on the measurement tool 100 to adapt the measurement tool 100 to the various sizes of orifice fittings F. It is to be understood that the adapters 200 may be of the sleeve-type variety as shown in FIG. 8 or the ring-type variety as shown in FIG. 10. Referring to FIG. 10, the adapter 200 is installed on the housing 50 with the first and second centering shafts 64 and 66, respectively, in the retracted position so that the centering balls 104 and 106 are permitted to be entirely within the housing. The adapter 200 is slid onto the housing 50 until the adapter centering balls 216 and 218 are radially aligned with the centering balls 104 and 106. As shown in FIG. 8, once the adapter 200 has been aligned, and the bores 222 are in alignment with the alignment bores 220 of the housing 50, an alignment screw locks the adapter 200 into position. The measurement tool 100 is now ready to be inserted into the longitudinal bore 16 of the orifice fitting F as described above. The determination of the eccentricity of the orifice plate bore 12 is accomplished as set forth above.

It is to be understood that the separate centering shafts 64 and 66 allow the measurement tool 100 to be radially centered even if the longitudinal bore 16 varies slightly in diameter along its length. This further increases the accuracy of the measurement tool 100.

Additionally, the diameter of the orifice plate bore 12 may be any of various sizes for a particular orifice fitting F. Thus, it is important to be able to use the same measurement tool 100 regardless of the diameter of the orifice plate bore 12. This is easily accomplished by removing the block setscrew 163 and removing the sliding block 158 from the diametric bore 152 and replacing it with a sliding block 158 having the proper size of insertion member 162 for the given orifice plate bore diameter. The block setscrew 162 is inserted into the groove 159 of the sliding block 158 so that the block 158 is allowed to slide in the diametric bore 152 while being prohibited from exiting the bore 152.

Having described the invention above, various modifications of the techniques, procedures, material and equipment will be apparent to those in the art. It is intended that all such variations within the scope and spirit of the invention be embraced thereby.

I claim:

1. A measurement tool for measuring the eccentricity of an orifice plate bore in a longitudinal bore of an orifice fitting, the measurement tool comprising:
   a housing having an internally threaded portion and a first and second plurality of radial bores;
   a first plurality of balls wherein at least one ball is inserted in each of said first radial bores;
   a second plurality of balls wherein at least one ball is inserted in each of said second radial bores;
   a first member having a first tapered surface contacting said first plurality of balls and a threaded portion engaging said internally threaded portion of said housing;
   a second member having a second tapered surface contacting said second plurality of balls and a threaded portion engaging said internally threaded portion of said housing,
   wherein said first and second members are capable of radially forcing said first and second pluralities of balls, respectively, outwardly of said housing against the longitudinal bore of the orifice fitting;
   an insertion member extending from said housing, said insertion member capable of being inserted in the orifice plate bore; and
   means for indicating the eccentricity of the orifice plate bore.

2. The measurement tool according to claim 1, wherein said insertion member has a tapered end portion.

3. The measurement tool according to claim 1, wherein said means for indicating comprises:
   a head assembly attached to said housing;
   a slide member connected to said insertion member and slidably mounted in said head assembly;
   a rod slidably inserted through said housing and into said head assembly, said rod having a first end and a second end;
   an arm pivotally mounted in said head assembly having a first surface in contact with said slide member and a second surface in contact with said first end of said rod;
   means for spring biasing said arm; and
   an indicator gauge assembly contacting said second end of said rod.

4. The measurement tool according to claim 1, further comprising:

means for adapting the measurement tool to center said housing in various orifice fittings having longitudinal bore diameters greater than said housing.

5. A measurement tool for measuring the eccentricity of an orifice plate bore in a longitudinal bore of an orifice fitting, the measurement tool comprising:
a housing having a first and second plurality of radial bores;
a first plurality of balls wherein at least one ball is inserted in each of said first radial bores;
a second plurality of balls wherein at least one ball is inserted in each of said second radial bores;
first means for radially forcing said first plurality of balls outwardly of said housing against the longitudinal bore of the orifice fitting;
second means for radially forcing said second plurality of balls outwardly of said housing against the longitudinal bore of the orifice fitting,
wherein said first and second radially forcing means are independent of one another;
an insertion member having a tapered end portion, said insertion member capable of being inserted in the orifice plate bore; and
means for indicating the eccentricity of the orifice plate bore.

6. The measurement tool according to claim 5, wherein said means for indicating comprises:
a head assembly attached to said housing;
a slide member connected to said insertion member and slidably mounted in said head assembly;
a rod slidably inserted through said housing and into said head assembly, said rod having a first end and a second end;
an arm pivotally mounted in said head assembly having a first surface in contact with said slide member and a second surface in contact with said first end of said rod;
means for spring biasing said arm; and
an indicator gauge assembly contacting said second end of said rod.

7. A measurement tool for measuring the eccentricity of an orifice plate bore in a longitudinal bore of an orifice fitting, the measurement tool comprising:
a housing having a first and second plurality of radial bores;
a first plurality of balls wherein at least one ball is inserted in each of said first radial bores;
a second plurality of balls wherein at least one ball is inserted in each of said second radial bores;
means for radially forcing said pluralities of balls outwardly of said housing against the longitudinal bore of the orifice fitting;
an insertion member having a tapered end portion, said insertion member capable of being inserted in the orifice plate bore;
means for indicating the eccentricity of the orifice plate bore,
wherein said housing includes an internally threaded portion and said means for forcing comprises:
a first member having a first tapered surface contacting said first plurality of balls and a threaded portion engaging said internally threaded portion of said housing; and
a second member having a second tapered surface contacting said second plurality of balls and a threaded portion engaging said internally threaded portion of said housing.

8. The measurement tool according to claim 7, further comprising:
means for adapting the measurement tool to center said housing in various orifice fittings having longitudinal bore diameters greater than said housing.

9. The measurement tool according to claim 8, wherein said housing is cylindrical and has an outer diameter and said means for adapting comprises:
a sleeve having an inside diameter slightly greater than the outer diameter of said cylindrical housing, said sleeve having a first and second plurality of radial bores corresponding to said first and second plurality of radial bores in said housing;
a first plurality of sleeve balls wherein at least one sleeve ball is inserted in each of said first radial bores in said sleeve; and
a second plurality of sleeve balls wherein at least one sleeve ball is inserted in each of said second radial bores in said sleeve.

10. The measurement tool according to claim 9, wherein said means for adapting further comprises means for aligning said first and second plurality of sleeve balls with said first and second plurality of balls in said housing respectively.

11. A measurement tool for measuring the eccentricity of an orifice plate bore in a longitudinal bore of an orifice fitting, the measurement tool comprising:
a cylindrical housing having an outer diameter and a first and second plurality of radial bores;
means for centering said cylindrical housing in the longitudinal bore;
an insertion member extending from said cylindrical housing, said insertion member capable of being inserted in the orifice plate bore;
means for indicating the eccentricity of the orifice plate bore; and
means for adapting the measurement tool to center said cylindrical housing in various orifice fittings having longitudinal bore diameters greater than the outer diameter of said cylindrical housing, wherein said means for adapting comprises:
a sleeve having an inside diameter slightly greater than the outer diameter of said cylindrical housing, said sleeve having a first and second plurality of radial bores corresponding to said first and second plurality of radial bores in said cylindrical housing;
a first plurality of sleeve balls wherein at least one sleeve ball is inserted in each of said first radial bores in said sleeve; and
a second plurality of sleeve balls wherein at least one sleeve ball is inserted in each of said second radial bores in said sleeve.

* * * * *